United States Patent
Shieh et al.

(10) Patent No.: US 11,799,150 B2
(45) Date of Patent: Oct. 24, 2023

(54) COOLING STRUCTURE FOR HYBRID-ELECTRIC VEHICLE BATTERY CELL ASSEMBLIES

(71) Applicant: Toyota Motor Engineering & Manufacturing North America, Inc., Plano, TX (US)

(72) Inventors: Tenghua Shieh, Ann Arbor, MI (US); Gaohua Zhu, Ann Arbor, MI (US); Evan Fleming, Ann Arbor, MI (US); Swetha Minupuri, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 644 days.

(21) Appl. No.: 16/932,243

(22) Filed: Jul. 17, 2020

(65) Prior Publication Data
US 2022/0021049 A1  Jan. 20, 2022

(51) Int. Cl.
*H01M 10/6556* (2014.01)
*B60K 1/04* (2019.01)
(Continued)

(52) U.S. Cl.
CPC .......... *H01M 10/6556* (2015.04); *B60K 1/04* (2013.01); *B60K 11/02* (2013.01); *H01M 10/613* (2015.04);
(Continued)

(58) Field of Classification Search
None
See application file for complete search history.

(56) References Cited

U.S. PATENT DOCUMENTS

| 7,746,033 B2 | 6/2010 | Lee et al. |
| 8,383,260 B2 | 2/2013 | Essinger et al. |

(Continued)

FOREIGN PATENT DOCUMENTS

| CN | 105932352 A | 9/2016 |
| CN | 106684498 A * | 5/2017 |

(Continued)

OTHER PUBLICATIONS

English language machine translation of Cui (CN 106684498 A). (Year: 2017).*

*Primary Examiner* — Eli S Mekhlin
(74) *Attorney, Agent, or Firm* — Christopher G. Darrow; Darrow Mustafa PC

(57) ABSTRACT

A cooling structure for a vehicle battery cell assembly includes a receptacle having a thermally-conductive floor. At least one first thermally conductive structure is positioned in an interior of the receptacle and in direct physical contact with a first side of the floor, and at least one second thermally conductive structure positioned in the interior of the receptacle in direct physical contact with the at least one first thermally conductive structure and spaced apart from the first side of the floor by the first thermally conductive structure. The cooling structure also includes a coolant conduit having an inlet, an outlet, and a flow passage in fluid communication with the coolant conduit inlet and outlet, the flow passage being in direct physical contact with an exterior of the receptacle along a second side of the floor opposite the first side of the floor.

15 Claims, 6 Drawing Sheets

(51) Int. Cl.
  *B60K 11/02*   (2006.01)
  *H01M 10/625*  (2014.01)
  *H01M 10/6568* (2014.01)
  *H01M 10/613*  (2014.01)

(52) U.S. Cl.
  CPC ..... *H01M 10/625* (2015.04); *H01M 10/6568* (2015.04); *B60K 2001/0438* (2013.01); *H01M 2220/20* (2013.01)

(56) References Cited

U.S. PATENT DOCUMENTS

| | | |
|---|---|---|
| 9,941,557 B2 | 4/2018 | Morse et al. |
| 10,205,201 B2 | 2/2019 | Park |
| 2011/0212355 A1* | 9/2011 | Essinger ........... H01M 10/6555 429/120 |
| 2015/0064522 A1 | 3/2015 | Kim |
| 2015/0235889 A1 | 8/2015 | Shih et al. |
| 2015/0255837 A1 | 9/2015 | Larsson |
| 2015/0318587 A1 | 11/2015 | Kim et al. |
| 2016/0164149 A1 | 6/2016 | Hodge et al. |
| 2016/0211558 A1 | 7/2016 | Ma |
| 2016/0236314 A1 | 8/2016 | Morinaga et al. |

FOREIGN PATENT DOCUMENTS

| | | | | |
|---|---|---|---|---|
| EP | 2475025 A1 | * | 7/2012 | ......... B60H 1/00278 |
| EP | 3392955 A1 | * | 10/2018 | .......... H01M 10/613 |
| JP | 2015111545 A | | 6/2015 | |
| WO | 2018055297 A2 | | 3/2018 | |

* cited by examiner

COOLING STRUCTURE FOR HYBRID-ELECTRIC VEHICLE BATTERY CELL ASSEMBLIES

TECHNICAL FIELD

The embodiments described herein relate to hybrid-electric vehicle battery systems and, more particularly, to a structure for cooling an arrangement of rechargeable battery cells in a hybrid-electric vehicle.

BACKGROUND

Rechargeable batteries (such as lithium-ion batteries) for hybrid electric vehicles generate large amounts of heat during operation of the vehicle. This heat must be removed rapidly and effectively to prevent overheating of the batteries. It is also advantageous arrange the batteries in a small volume of space so as to occupy minimum space inside the vehicle. To meet vehicle power requirements, a vehicle may employ a relatively larger number of smaller, lower-capacity batteries, which may be easier to cool than a relatively smaller number of larger, higher capacity batteries. However, it has also proven difficult to effectively cool densely-packed battery cell arrangements without using relatively complex cooling structures.

SUMMARY

In one aspect of the embodiments described herein, a cooling structure is provided for a vehicle battery cell assembly. The cooling structure includes a receptacle having a thermally-conductive floor, at least one first thermally conductive structure positioned in an interior of the receptacle and in direct physical contact with a first side of the floor, and at least one second thermally conductive structure positioned in the interior of the receptacle in direct physical contact with the at least one first thermally conductive structure and spaced apart from the first side of the floor by the first thermally conductive structure. The cooling structure also includes a coolant conduit having an inlet, an outlet, and a flow passage in fluid communication with the coolant conduit inlet and outlet. The flow passage is in direct physical contact with an exterior of the receptacle along a second side of the floor opposite the first side of the floor.

In another aspect of the embodiments described herein, a vehicle battery is provided. The battery module includes a receptacle including a floor. A pair of first thermally conductive structures is positioned spaced apart in an interior of the receptacle and in direct physical contact with a first side of the floor. A second thermally conductive structure is positioned in direct physical contact with each one of the first thermally conductive structures of the pair of first thermally conductive structures. Each second thermally conductive structure is spaced apart from the first side of the floor by an associated one of the first thermally conductive structures. Also included is a coolant conduit having an inlet, an outlet, and a flow passage in fluid communication with the coolant conduit inlet and outlet. The flow passage is in direct physical contact with an exterior of the receptacle along a second side of the floor opposite the first side of the floor. A first plurality of battery cell assemblies is also provided. Each battery cell assembly of the first plurality of battery cell assemblies is in direct physical contact with one of the second thermally conductive structures. A second plurality of battery cell assemblies is also provided. Each battery cell assembly of the second plurality of battery cell assemblies is in direct physical contact with another one of the second thermally conductive structures.

In another aspect of the embodiments described herein, a cooling structure for a vehicle battery cell assembly is provided. The cooling structure includes a receptacle including a thermally-conductive floor and at least one first thermally conductive structure positioned in an interior of the receptacle. At least one second thermally conductive structure is positioned in the interior of the receptacle in direct physical contact with the at least one first thermally conductive structure along a first side of the at least one first thermally conductive structure. In addition, at least one third thermally conductive structure is positioned in the interior of the receptacle and in direct physical contact with the at least one first thermally conductive structure along a second side of the at least one first thermally conductive structure opposite the first side of the at least one first thermally conductive structure. The at least one third thermally conductive structure is positioned in direct physical contact with a first side of the floor. The cooling structure also includes a coolant conduit having an inlet, an outlet, and a flow passage in fluid communication with the coolant conduit inlet and outlet. The flow passage is in direct physical contact with an exterior of the receptacle along a second side of the floor opposite the first side of the floor.

DETAILED DESCRIPTION

Described herein are embodiments of a cooling structure for a vehicle battery cell assembly. The cooling structure includes a receptacle having a thermally-conductive floor, at least one first thermally conductive structure positioned in an interior of the receptacle and in direct physical contact with a first side of the floor, and at least one second thermally conductive structure positioned in the interior of the receptacle in direct physical contact with the at least one first thermally conductive structure and spaced apart from the first side of the floor by the first thermally conductive structure. The cooling structure also includes a coolant conduit having an inlet, an outlet, and a flow passage in fluid communication with the coolant conduit inlet and outlet, the flow passage being in direct physical contact with an exterior of the receptacle along a second side of the floor opposite the first side of the floor. An array or arrangement of battery cell assemblies may be secured to the second thermally conductive structure. Heat from the battery cell assemblies may be transferred through the second thermally conductive structure to the first thermally conductive structure, then to the receptacle floor. Heat flows through the receptacle floor to a coolant material circulating along the flow passage. In this manner, the battery cell assemblies may be cooled.

Figure 1:
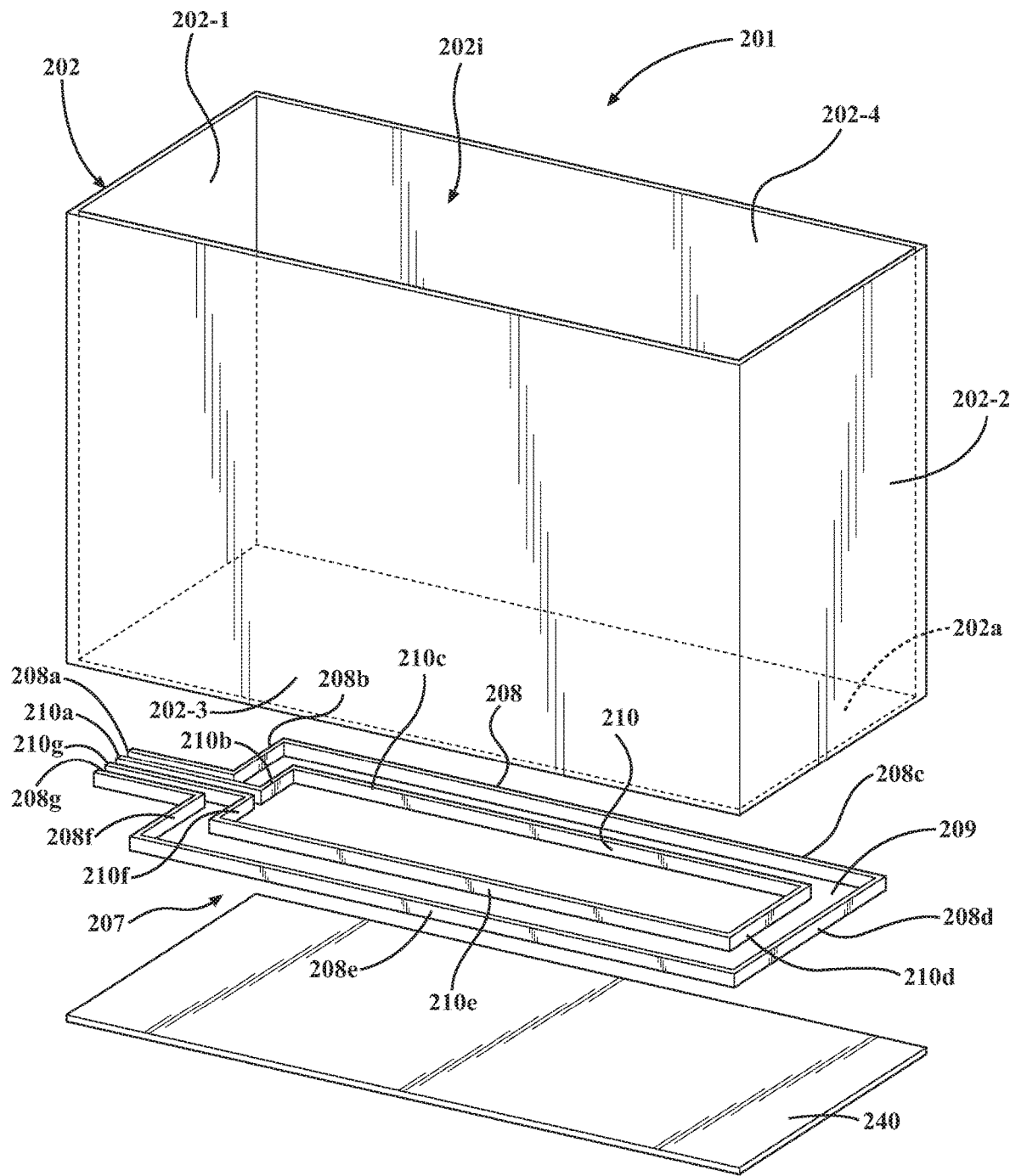
FIG. 1 is a schematic exploded perspective view of a vehicle battery cell cooling structure in accordance with an embodiment described herein.
Figure 2:
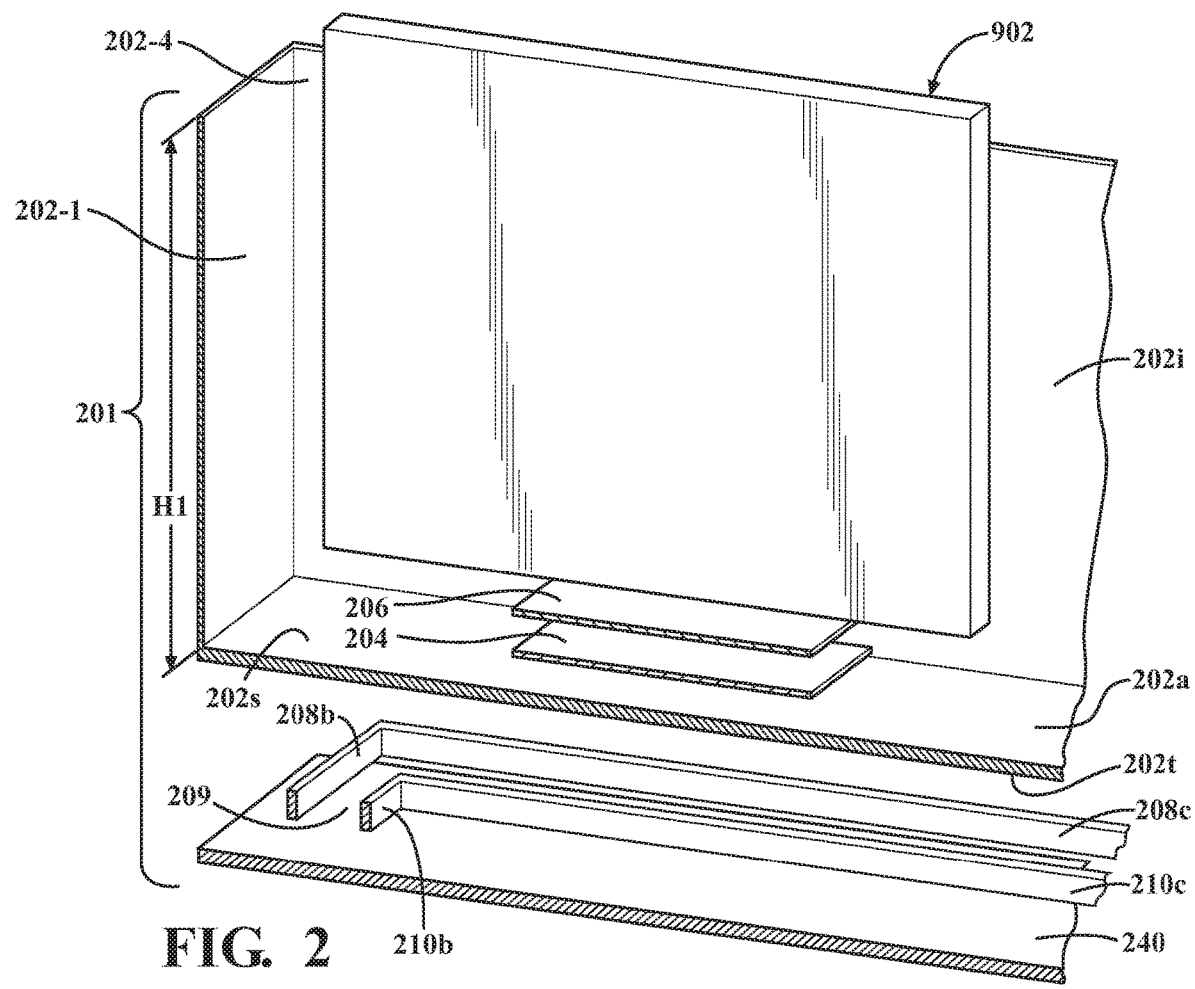
FIG. 2 is a magnified view of a portion of the cooling structure shown in FIG. 1, shown with an exemplary battery cell assembly mountable thereto.
Figure 3:
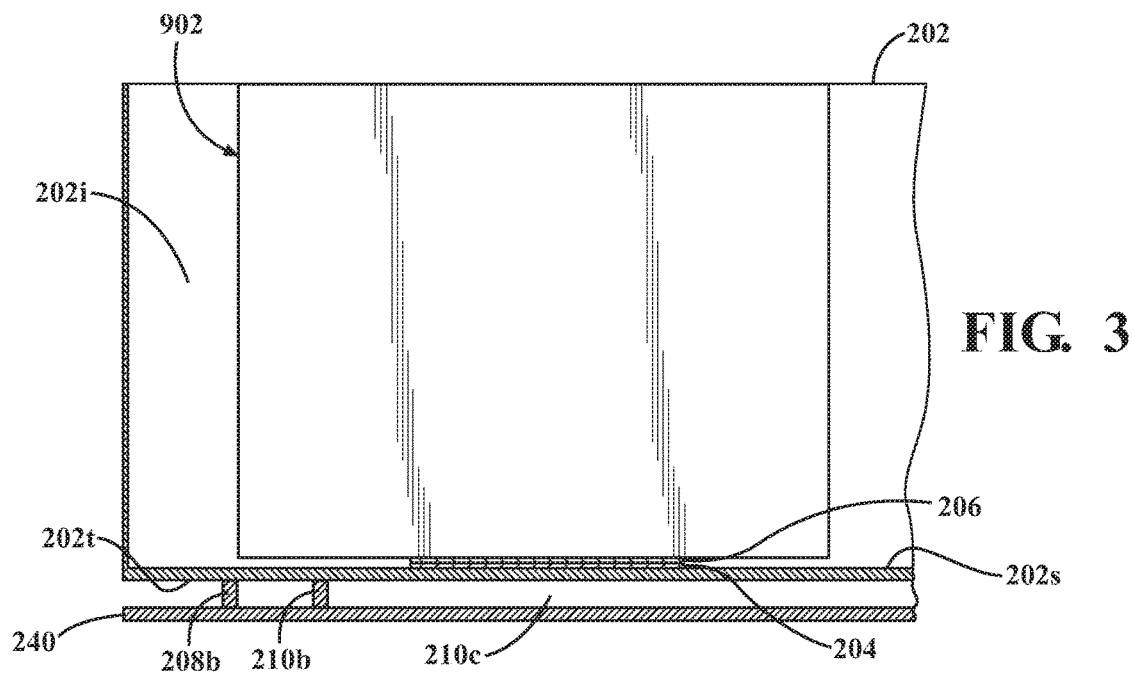
FIG. 3 is a schematic side view of the portion of the cooling structure shown in FIG. 2, shown in an assembled condition with the battery cell assembly mounted to the cooling structure.

FIG. 1 is a schematic exploded perspective view of a vehicle battery cell cooling structure 201 in accordance with an embodiment described herein. FIG. 2 is a magnified exploded view of a portion of the cooling structure 201 shown in FIG. 1, shown with an exemplary battery cell assembly 902-1 mounted thereto. FIG. 3 is a schematic side view of the portion of the cooling structure shown in FIG. 2, also showing an example of an exemplary battery cell assembly 902 mounted on a second thermally conductive structure 206 of the cooling structure.

Referring to FIGS. 1-3, in one or more arrangements, the cooling structure 201 includes a receptacle 202 having a flat thermally-conductive floor 202a. Floor 202a may have a first (interior) surface or side 202s and a second (exterior) surface or side 202t opposite the first side 202s. A first wall 202-1 extends from a first edge of the floor 202a, and a second wall 202-2 extends from a second edge of the floor 202a opposite the first edge, with the second wall 202-2 facing the first wall 202-1. In addition, a third wall 202-3 extends from a third edge of the floor 202a, and a fourth wall 202-4 extends from a fourth edge of the floor 202a opposite the third edge, with the fourth wall 202-4 facing the third wall 202-3. The third wall 202-3 extends between (and is connected to) the first and second walls 202-1, 202-2. The fourth wall 202-4 also extends between (and is connected to) the first and second walls 202-1, 202-2. The floor 202a and the connected walls combine to define an interior 202i of the receptacle 202 structured for receiving therein a plurality of vehicle battery cell assemblies as described herein. In one or more arrangements, each of walls 202-1, 202-1, 202-3, 202-4 may be structured to extend to a predetermined height H1 above the receptacle floor first side 202s at least equal to an associated height of a vehicle battery cell assembly mounted inside the receptacle interior 202i. In one or more arrangements, receptacle 202 may be formed from a suitable high thermal conductivity metallic material, such as stainless steel or a copper allow. If desired, surface flatness requirements for the surfaces of the receptacle 202 contacting the first thermally conductive structure 204 may be suitably specified so as to "level out" surface asperities, thereby increasing the effective contact area between the surfaces.

Referring to FIGS. 2 and 3, embodiments of the cooling structure 201 may also include at least one first thermally conductive structure 204 positioned in the interior 202i of the receptacle 202 and in direct physical contact with the first side 202s of the floor 202a. The first thermally conductive structure 204 may be secured to the floor first side 202s by any suitable means, depending primarily on such factors as the materials from which the first thermally conductive structure 204 and the receptacle 202 are formed. Any securement method used may be selected so as to maximize thermal contact and heat transfer from the first thermally conductive structure 204 to the receptacle floor 202a. In particular embodiments, a suitable thermally-conductive adhesive may be used.

In one or more arrangements, the first thermally conductive structure 204 may be a solid block of homogeneous, thermally-conductive material. In other arrangements, the first thermally conductive structure 204 may be a heat pipe apparatus (commonly known as a "vapor chamber") structured to receive heat from a thermal transfer material 206 (described in greater detail below) in direct physical contact with the heat pipe and also with one or more battery cell assemblies 902. The heat pipe may be structured to facilitate heat transfer from the heat pipe through the receptacle floor 202a to coolant flowing in a coolant conduit (described in greater detail below), the coolant being in direct physical contact with the receptacle floor 202a along the floor second side 202t. In embodiments where the first thermally conductive structure 204 is a solid block of homogeneous, thermally-conductive material, suitable materials may include stainless steels and copper alloys. If desired, surface flatness requirements for the surfaces of the first thermally conductive structure 204 contacting the receptacle 202 may be suitably specified so as to "level out" surface asperities, thereby increasing the effective contact area between the surfaces. In one or more arrangements, thickness(es) of the first thermally conductive structure(s) 204 (i.e., the dimensions of the first thermally conductive structure(s) 204 extending between associated second thermally conductive structure(s) 206 and the receptacle floor 202a) may be in the range of 1-5 millimeters.

A first thermally conductive structure in the form of a heat pipe may have any structure suitable for the purposes described herein. For example, using known principles of heat pipe operation, the heat pipe may have a portion in thermal contact with some or all of the thermal transfer material 206. In one or more arrangements, the thermal transfer material 206 may be coextensive with the heat pipe 204 (i.e., the thermal transfer material 206 and the heat pipe 204 may have the same "footprint"). Heat received from the thermal transfer material 206 may evaporate a working fluid contained in the heat pipe. The working fluid vapor may then travel (or be directed) in a direction toward the receptacle floor 202a, which serves effectively as a relatively cold surface in thermal contact with the heat pipe. The vapor may then condense to liquid, thereby releasing heat to the receptacle floor 202a. The liquid may then travel back through the heat pipe in a direction toward the heat source, by capillary action for example. Typically, such heat pipes may be constructed from materials such as copper and/or stainless steel. The heat pipe 204 may use water or any other suitable material as a working fluid.

Referring to FIG. 2, embodiments of the cooling structure 201 may also include at least one second thermally conductive structure 206 positioned in the interior 202i of the receptacle 202 in direct physical contact with the first thermally conductive structure 204 and spaced apart from the first side 202s of the floor 202a by the first thermally conductive structure 204. The second thermally conductive structure 206 may be in direct physical contact with one or more battery cell assemblies 902 mounted in the receptacle 202. In one or more arrangements, the second thermally conductive structure 206 may be a layer of a thermal transfer material suitable for the purposes described herein. The thermal transfer material may be a high-thermal conductivity material configured to enable rapid and efficient heat transfer from a battery cell assembly to an associated first thermally conductive structure 204. The thermal transfer material may have a structure which is malleable responsive to pressure applied to the material, for example to pressure applied on a battery cell assembly 902 to force the cell assembly into intimate physical contact with the thermal transfer material. This structure of the thermal transfer material facilitates the establishment of intimate thermal contact between the battery cell assembly 902 and the second thermally conductive structure 206, and also between the second thermally conductive structure 206 and the first thermally conductive structure 204. Examples of suitable thermal transfer materials include Grafoil® flexible graphite paper gaskets and structures including high thermal-conductivity materials such as ceramic, graphite, boron nitride, alumina or a similar material embedded or supported in a polymer matrix. Another example of a suitable thermal transfer material is in the form of a known thermally-conductive interface pad having a malleable "chewing gum" consistency. Such pads may be formed from acrylics or silicone and may be available from 3M Corporation. Another example of a suitable thermal transfer material is in the form of a known flowable, high-thermal conductivity thermal grease or semi-liquid gap filler. Various types of thermal transfer materials suitable for the purposes described herein may also be available from the Bergquist Company or an associated distributor (https://www.henkel-adhesives.com/us/en/products/thermal-management-materials.html). In one or more arrangements, the thermal transfer material layers 206 may have thicknesses in the range 50 μm-3.0 millimeters, depending on the material used.

Figure 4:
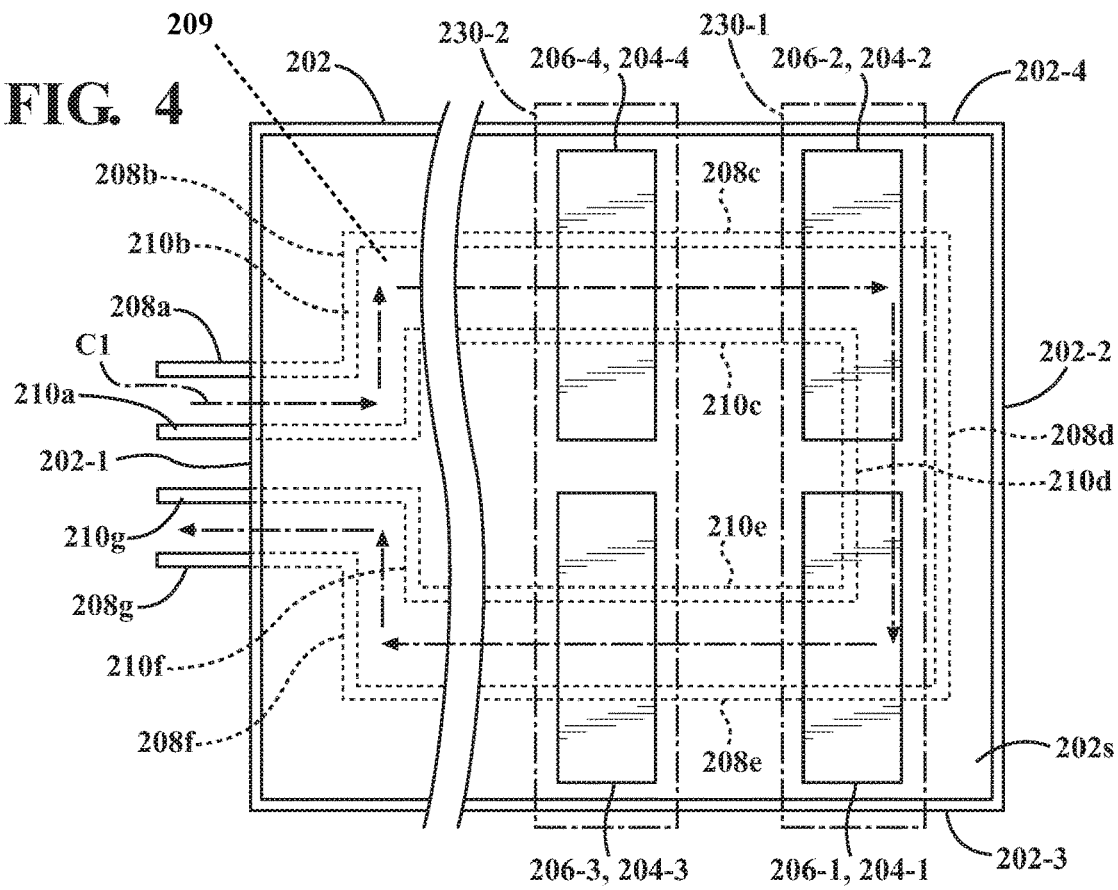
FIG. 4 is a schematic plan view of portions of the cooling structure shown in FIG. 1.

FIG. 4 is a schematic plan view of a portion of the cooling structure shown in FIG. 1. Referring to FIGS. 1-4, embodiments of the cooling structure 201 may also include a coolant conduit 207. In one or more arrangements, the coolant conduit 207 may have an outer wall 208 and an inner wall 210 spaced apart from and residing opposite the outer wall 208. The spaces between opposed portions of the outer wall 208 and inner wall 210 may be structured to form, in combination, a coolant flow passage 209 when the outer wall 208 and inner wall 210 are secured between the receptacle floor 202a and a bottom plate 240 as described herein.

In the particular embodiment shown in the drawings, outer wall 208 may include a first portion 208a, a second portion 208b extending from the first portion 208a, a third portion 208c extending from the second portion 208b, a fourth portion 208d extending from the third portion 208c, a fifth portion 208e extending from the fourth portion 208d, a sixth portion 208f extending from the fifth portion 208e, and a seventh portion 208g extending from the sixth portion 208f. The outer wall portions 208a-208f may be connected such that the outer wall 208 forms a fluid tight boundary along its entire length.

Similarly, inner wall 210 may include a first portion 210a, a second portion 210b extending from the first portion 210a, a third portion 210c extending from the second portion 210b, a fourth portion 210d extending from the third portion 210c, a fifth portion 210e extending from the fourth portion 210d, a sixth portion 210f extending from the fifth portion 210e, and a seventh portion 210g extending from the sixth portion 210f. The inner wall portions 210a-210g may be connected such that the inner wall 210 forms a fluid tight boundary along its entire length.

Each portion of the inner wall 210 may reside opposite and spaced apart from a corresponding portion of the outer wall 208 (i.e., the inner wall first portion 210a may reside opposite the outer wall first portion 208a, the inner wall second portion 210b may reside opposite the outer wall second portion 208b, etc.). In one or more embodiments, the inner and outer walls 210, 208 may be formed from a suitable polymer material, such as polypropylene.

The space between inner and outer wall first portions 210a, 208a may form a fluid inlet (or outlet) for the flow passage 209. Similarly, the space between inner and outer wall seventh portions 210g, 208g may form a fluid outlet (or inlet) for the flow passage 209. FIG. 4 shows one example of a flow of coolant C1 into an inlet of the conduit 207, around the coolant passage 209 and out an outlet of the conduit.

The spacings between opposing portions of the inner and outer walls 210, 208 and other dimensions of the flow passage 209 may be varied as needed to control aspects of fluid volumetric flow rate and other flow characteristics. For example, the distances between the opposed walls of the flow passage 209 may be increased to simultaneously increase the area of the portion of the flow channel residing opposite the first and second thermally-conductive structures 204, 206, while also enabling an increase in the volumetric flow rate of coolant through the associated portion of the flow passage 209. Also the overall shape of the flow passage 209 as defined by the inner and outer walls 210, 208 may be varied from the structure shown to accommodate different battery cell assembly densities and positioning arrangements within the receptacle 202. In addition, the sizes of the first and second thermally conductive structures 204, 206 may be varied to optimize heat transfer efficiency to the coolant in the flow passage 209. For example, the sizes of the first and second thermally conductive structures 204, 206 may be increased to increase the contact areas between the first and second thermally conductive structures 204, 206 and the battery assemblies 902, thereby increasing heat transfer capacity.

Referring to FIGS. 1-4, the outer and inner walls 208, 210 may be positioned and (optionally) secured to either of the receptacle floor second side 202t or bottom plate 240 in the configuration shown. The bottom plate 240 may then be secured to the receptacle 202 with the inner and outer walls 210, 208 pressed between the receptacle floor 202a and the bottom plate 240 such that a fluid-tight seal is formed at the interfaces between each of walls 208, 210 and the bottom plate 240 and between each of walls 208, 210 and the receptacle floor 202a. Thus, the receptacle floor 202a is in direct physical contact with the coolant conduit 207 (and with coolant flowing through the conduit) along a first side of the conduit, and the bottom plate 240 is in direct physical contact with the conduit 207 (and with coolant flowing through the conduit) along a second side of the conduit opposite the first side. The flow passage 209 is thus has a rectangular cross-section defined between inner wall 210, outer wall 208, bottom plate 240, and receptacle floor second side 202t. The bottom plate 240 may be secured to the receptacle 202 using any suitable method, for example, mechanical fasteners. If desired or needed to provide a fluid-tight seal between the walls 208, 210 and the bottom plate 240 and/or the receptacle floor 202a, a seal or gasket (not shown) may be positioned between the walls 208, 210 and the bottom plate 240 and/or the receptacle floor 202a.

Figure 5:
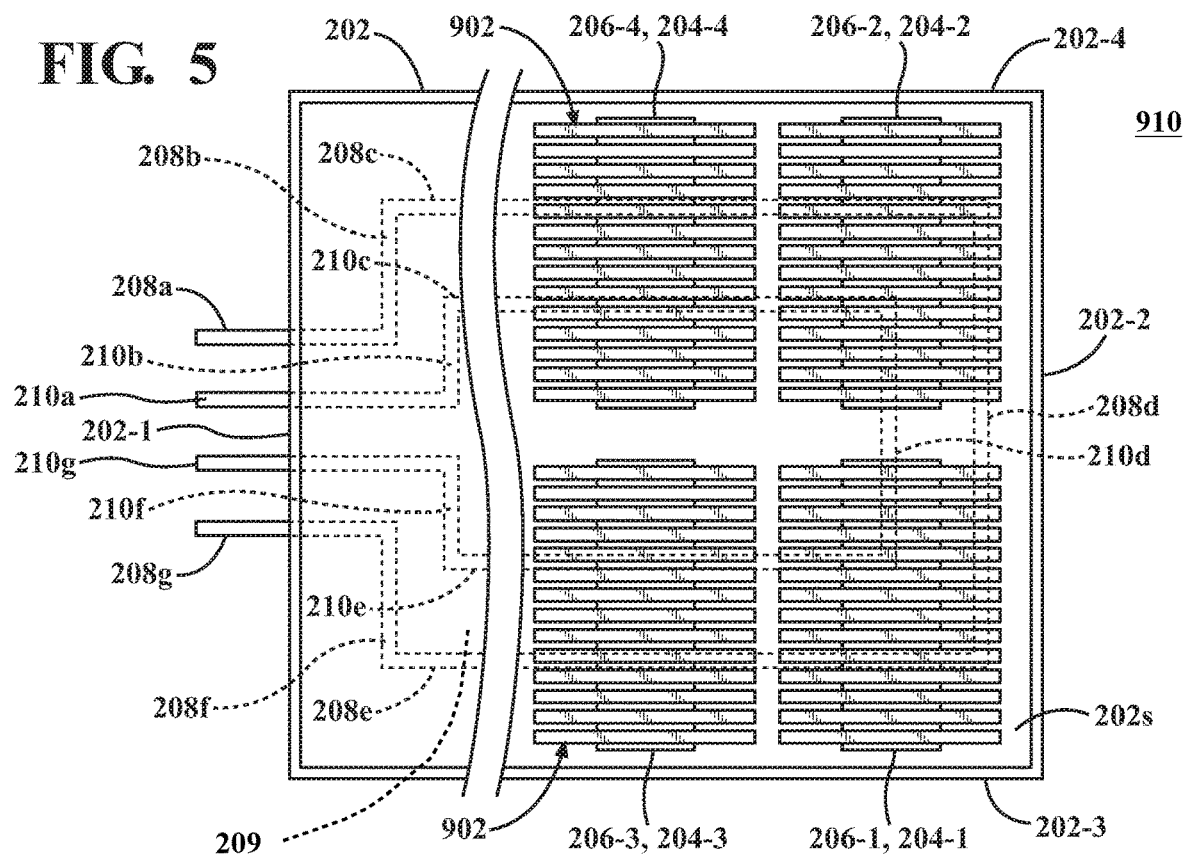
FIG. 5 is the plan view of FIG. 4 showing a possible arrangement of battery cell assemblies in thermal communication with the cooling structure to form a battery module.

Any coolant material suitable for the purposes described herein may be directed through the coolant flow passage 209, depending on the amount of heat to be removed from the battery cells, the dimensions of the coolant flow passages, and other pertinent parameters. One example of a suitable coolant material is water. Other coolant materials may also be used provided they can be directed through the flow passage at a rate suitable for removing a required amount of heat from the battery cell assemblies. FIG. 4 also shows an arrangement of multiple first thermally conductive structures 204 and second thermally conductive structures 206 mounted to the receptacle floor 202a as previously described in a spaced-apart arrangement. Specifically, as well as examples 204-1, 206-1 of the first thermally conductive structure 204 and second thermally conductive structure 206 which are mounted to the receptacle floor 202a as previously described, the embodiment shown includes another first thermally conductive structure 204-2 positioned in the interior 202i of the receptacle 202 in direct physical contact with the first side 202s of the floor 202a. The other first thermally conductive structure 204-2 is spaced apart from the first thermally conductive structure 204-1. The other first thermally conductive structure 204-2 may have the same structure as the first thermally conductive structure 204-1. In addition, another second thermally conductive structure 206-2 is positioned in the interior 202i of the receptacle 202 in direct physical contact with the other first thermally conductive structure 204-2 and is spaced apart from the first side 202s of the floor 202a by the other first thermally conductive structure 204-2. As shown, the other second thermally conductive structure 206-2 is spaced apart from the second thermally conductive structure 206-1. The other second thermally conductive structure 206-2 may have the same structure as the second thermally conductive structure 206-1. As seen in FIG. 4, a portion of the flow passage 209 along receptacle floor second side 202t may reside directly opposite each of the first thermally conductive structure(s) 204 secured to the receptacle floor 202a along receptacle floor first side 202s. This may facilitate heat transfer from the first thermally conductive structure(s) 204 through the receptacle floor 202a to the fluid in the flow passage 209. A portion of the flow passage 209 may be considered to be "directly opposite" a thermally conductive structure when the boundaries of the flow passage and the thermally conductive structure overlap when observed in a plan view, as shown in FIGS. 4 and 5. For example, FIG. 4 shows portions of the first and second thermally conductive structures 204, 206 overlying associated portions of the flow passage 209, where the first and second thermally conductive structures 204, 206 are separated from the flow passage 209 (and the coolant material flowing therethrough) by the receptacle floor 202a as described herein. In other arrangements, a portion of the flow passage may not reside directly opposite a first thermally conductive structure, but heat from the first thermally conductive structure may be transferred to a portion of the flow passage 209 via conduction through the receptacle floor.

Combined, the groups (204-1, 206-1 and 204-2, 206-2) of stacked first and second thermally conductive structures may form a row 230-1 of thermally conductive structures. Additional such rows of stacked first and second thermally conductive structures may be secured to the receptacle floor 202a. FIG. 4 shows two adjacent rows 230-1 and 230-2 of spaced apart groups of first and second thermally conductive structures. The receptacle 202 may include as many such rows as desired. In a particular embodiment, a receptacle 202 has 8 such rows of spaced apart groups of first and second thermally conductive structures, the groups being arranged so that a portion of the flow passage 209 is positioned directly opposite each group as shown in FIG. 4, so that coolant may flow under each group of first and second thermally conductive structures positioned in the receptacle.

Figure 6:
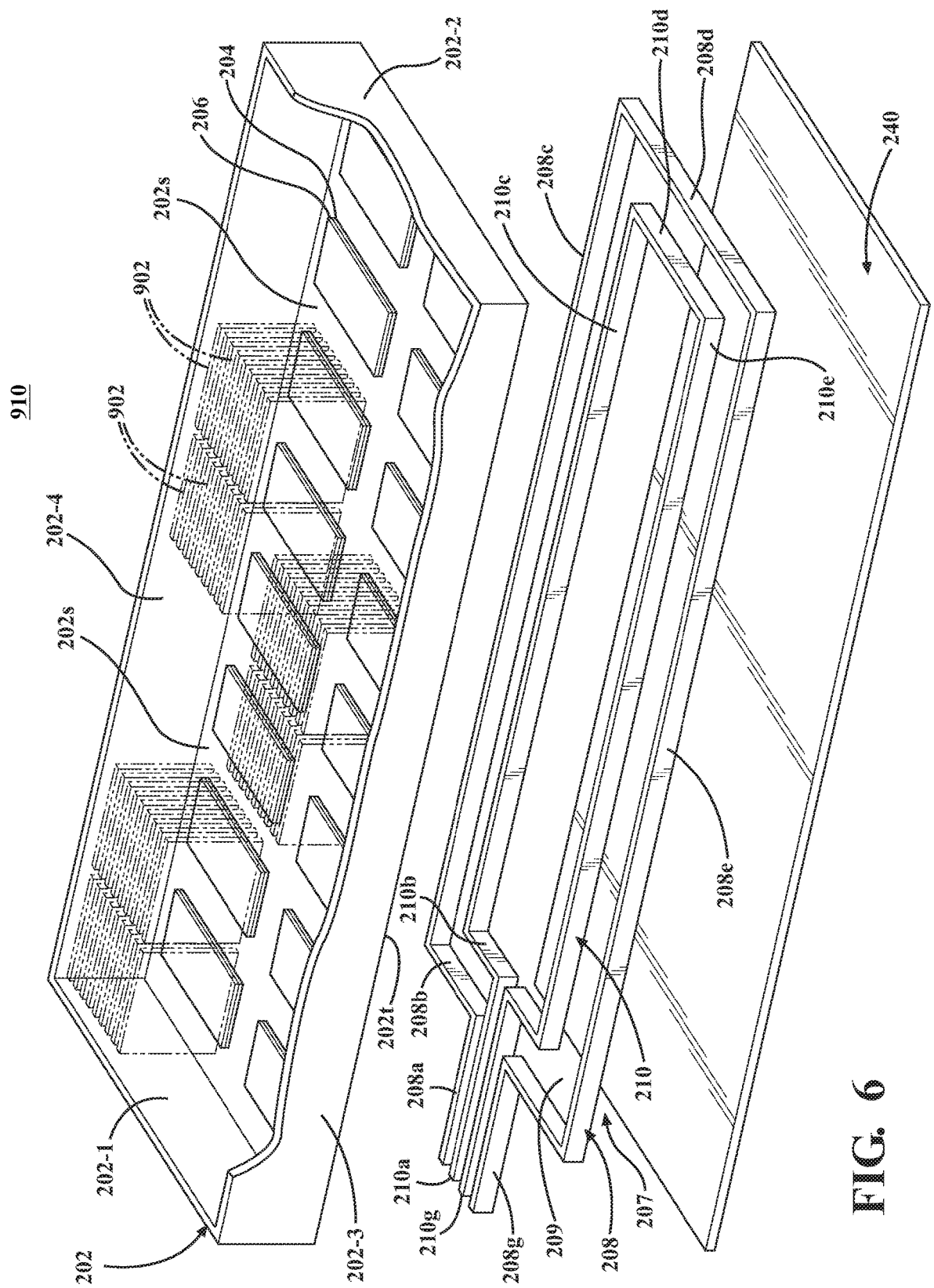
FIG. 6 is a schematic exploded perspective view of the battery module shown in FIG. 5.

FIG. 5 is the plan view of FIG. 4 showing a possible arrangement of battery cell assemblies 902 in thermal communication with the cooling structure to form a battery module 910. FIG. 6 is a schematic exploded perspective view of the battery module 910 shown in FIG. 5. FIG. 6 shows one example of an arrangement of multiple battery cell assemblies 902 mounted in the cooling structure 201 described in FIG. 1-4. Each battery cell assembly 902 may be secured in direct physical contact with an associated second thermally conductive structure 206 as previously described. The number of battery cell assemblies 902 that may be secured to a given second thermally conductive structure 906 may depend on factors such as the sizes of the battery cell assemblies, the heat generated by the battery cell assemblies, the spacing required between adjacent battery cell assemblies, and other pertinent factors. In particular arrangements, eighteen battery cell assemblies 902 may be mounted on each associated second thermally conductive structure 906.

Figure 7:
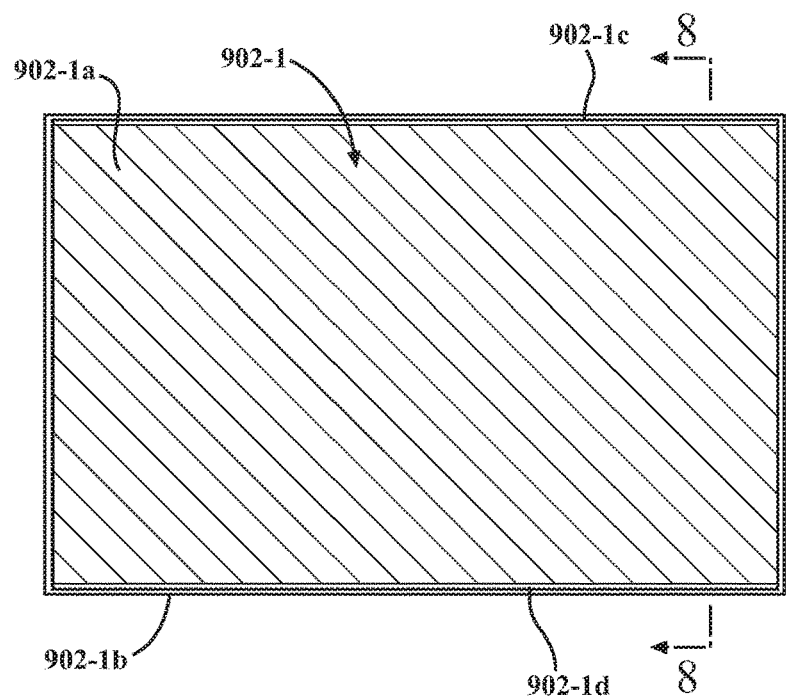
FIG. 7 is a schematic side cross-sectional view of an exemplary battery cell assembly in accordance with embodiments described herein.
Figure 8:
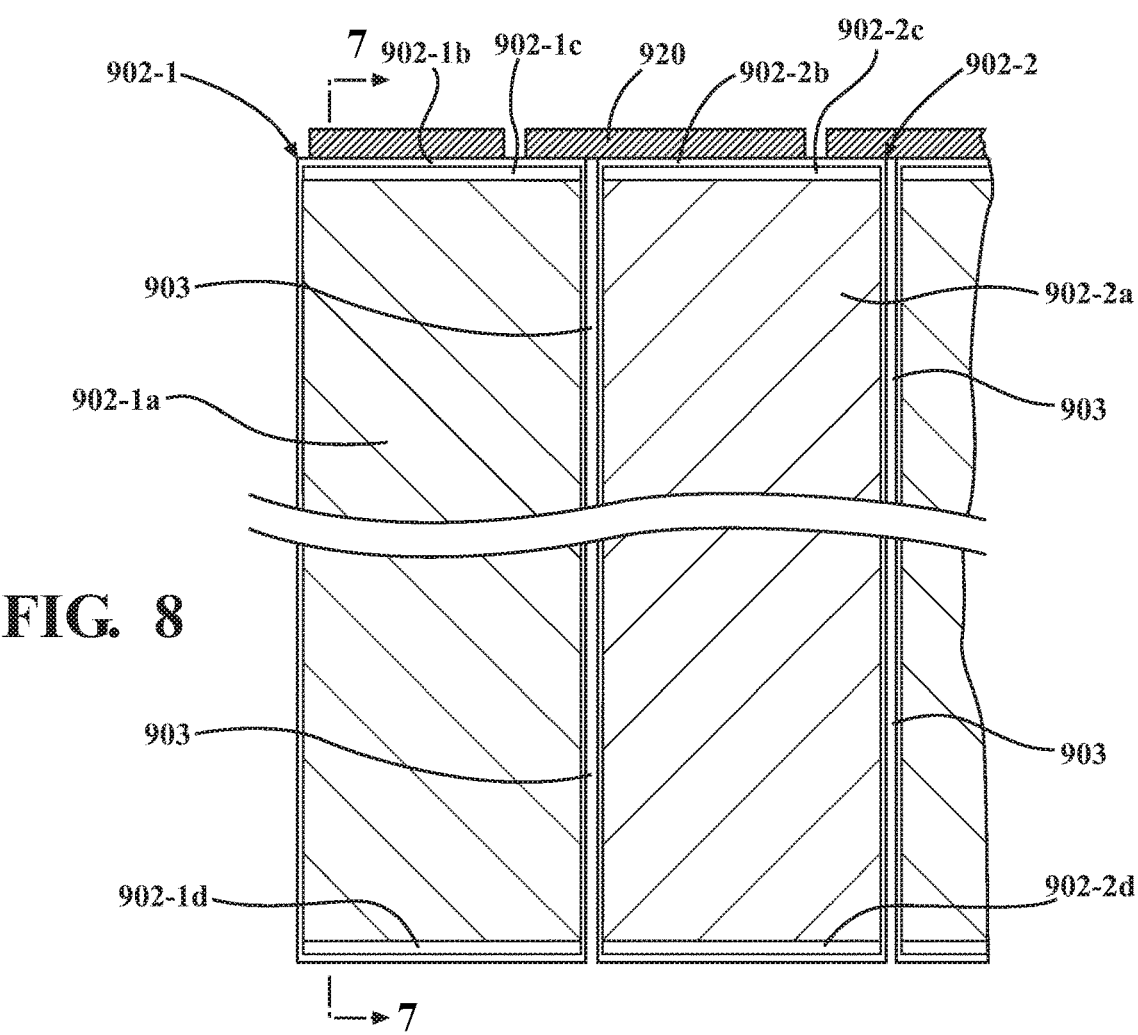
FIG. 8 is an end view of a pair of adjacent battery cell assemblies as shown in FIG. 7, with the cell assemblies arranged as when they are in thermal communication with a cooling structure as shown in FIGS. 5 and 6.

Referring now to FIGS. 7 and 8, FIG. 7 is a schematic cross-sectional side view of an exemplary battery cell assembly 902-1 in accordance with embodiments described herein. FIG. 8 is a schematic cross-sectional end view of a pair of adjacent battery cell assemblies 902-1, 902-2 as shown in FIG. 7, with the battery cell assemblies arranged as when they would be when in thermal communication with a cooling structure as shown in FIGS. 5 and 6.

Referring to FIG. 7, in one or more arrangements, battery cell assembly 902-1 may be a lithium-ion battery cell assembly or any other type of battery cell assembly suitable for use in a hybrid-electric vehicle. The battery cell assembly 902-1 may include a battery cell 902-1a and a casing 902-1b enclosing the battery cell 902-1a on all six sides. As seen in the drawings, the casing 902-1b may be in direct physical contact with the cell 902-1a along four sides of the cell. Along a top of the cell assembly, a space 902-1c may be provided between a top of the cell 902-1a and a top of the casing 902-1b. Also, along a bottom of the battery cell assembly 902-1, a space 902-1d may be provided between a bottom of the cell 902-1a and a bottom of the casing 902-1b. Other configurations of a cell and an associated casing may also be used. As seen in FIG. 8, adjacent battery cell assemblies 902-1 and 902-2 may be spaced apart a distance 903 when the battery cell assemblies are mounted in the receptacle 202 as shown in FIGS. 5 and 6. Along tops of the cell assemblies, a buss bar 920 or other power transfer structure may contact the cell assemblies 902 for power transfer.

The battery cell assemblies 902 may be secured in the receptacle using any suitable method. The weights of the battery assemblies 902 will press down on the first and second thermal thermally conductive structures 204, 206. In addition, any of a variety of methods may be used to apply additional pressure to the battery assemblies. For example, bars or straps (not shown) may be positioned in contact with the tops of the battery cell assemblies 902. The bars or straps may be secured at ends thereof to apply pressure to the tops of the battery assemblies to enhance thermal contact between the assemblies 902 and associated first thermally conductive structures 204, and to secure the battery assemblies 902 in position during vehicle vibration and collision.

In operation, with battery cell assemblies 902 mounted in the receptacle 202 as previously described, a power transfer mechanism may be electrically coupled to the battery cell assemblies 902. As the battery cell assemblies 902 are discharged and charged, a flow of coolant may be directed along flow passage 209 to urge heat transfer from the battery cell assemblies 902 through the stacked first and second thermally conductive structures 204, 206 and the receptacle floor 202a. In this manner, the battery cell assemblies 902 may be cooled.

Figure 9:
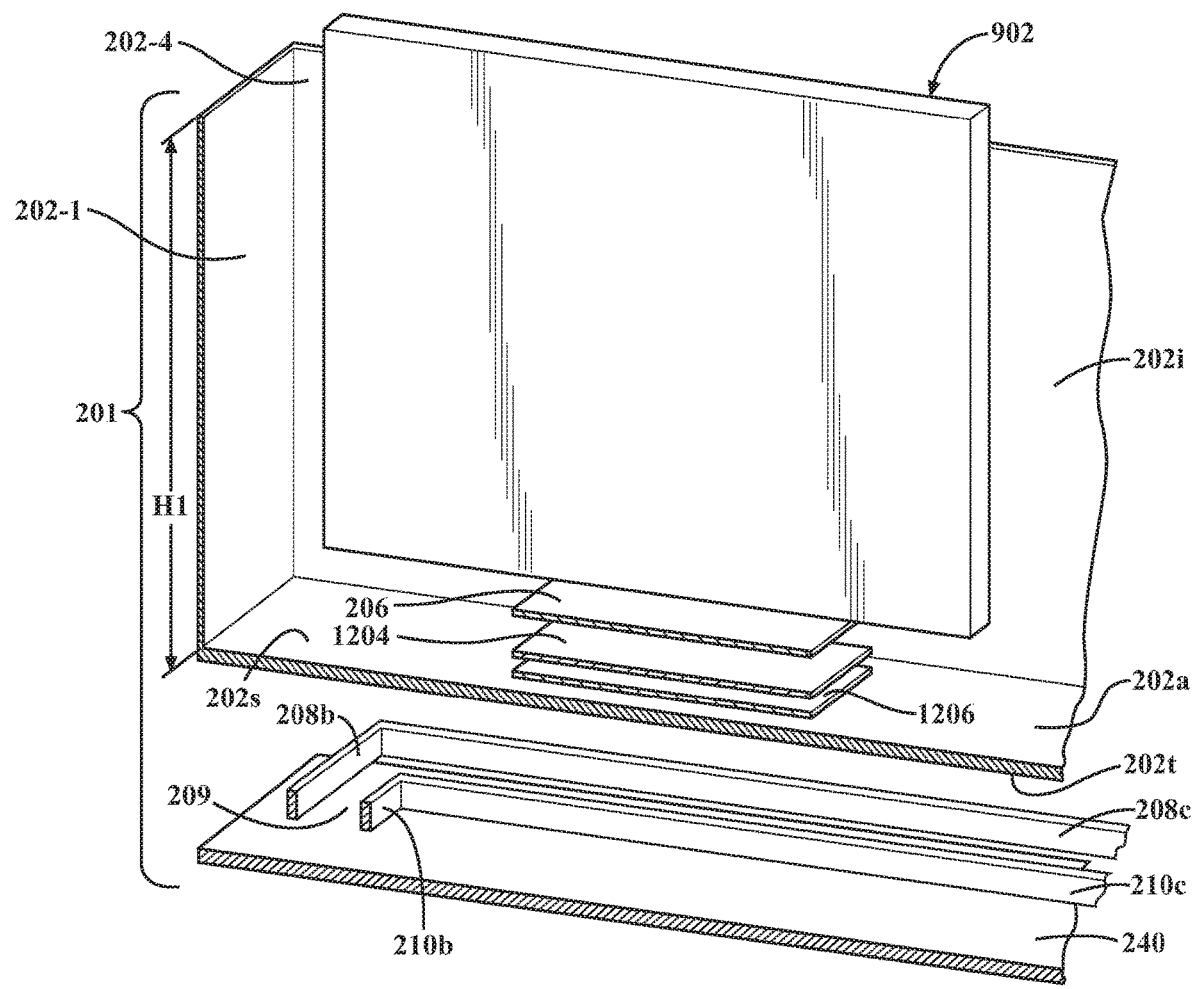
FIG. 9 is a magnified view of a portion of an alternative embodiment of the cooling structure similar to the embodiment shown in FIG. 2.

FIG. 9 is a magnified view of a portion of an alternative embodiment of the cooling structure similar to the embodiment shown in FIG. 2. Referring to FIG. 9, in particular arrangements, the cooling structure may include the receptacle 202 and at least one first thermally conductive structure 1204 positioned in an interior of the receptacle. First thermally conductive structure 1204 may be structured the same as first thermally conductive structure 204 previously described. At least one second thermally conductive structure 206 as previously described may be positioned in the interior of the receptacle in direct physical contact with the at least one first thermally conductive structure 204 along a first side of the first thermally conductive structure 204. In addition, at least one third thermally conductive structure 1206 may be positioned in the interior of the receptacle and in direct physical contact with the at least one first thermally conductive structure 1204 along a second side of the at least one first thermally conductive structure 1204 opposite the first side of the first thermally conductive structure 1204. The at least one third thermally conductive structure 1206 may also be positioned in direct physical contact with the first side 202s of the floor 202a. Thus, in the embodiment shown in FIG. 9, the first thermally conductive structure 1204 is not in direct physical contact with the receptacle floor 202a as is first thermally conductive structure 204 of the embodiment shown in FIG. 2. Rather, the first thermally conductive structure 1204 is spaced apart from the receptacle floor 202a by the third thermally conductive structure 1206. Aside from the variations just described, the embodiment of the cooling structure shown in FIG. 9 may be structured the same as the embodiment shown in FIG. 2.

In one or more arrangements, the third thermally conductive structure 1206 may be an additional layer of thermal transfer material positioned between each first thermally conductive structure 1204 and the receptacle floor 202a. The thermal transfer material 1206 may be a material similar to that previously described with respect to FIG. 2. As well as performing a thermal transfer function, the additional layers 1206 of thermal transfer material may dampen or attenuate vibrations which may be otherwise transmitted from the receptacle 202 to the battery cell assemblies 902 described herein.

As seen from the previous description and accompanying drawings, the cooling structure described herein enables efficient cooling of an arrangement of densely-packed vehicle battery assemblies using a single flow channel or cooling loop.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the embodiments described herein.

What is claimed is:

1. A cooling structure for a vehicle battery cell assembly, the cooling structure comprising:
   a receptacle including a thermally-conductive floor;
   at least one first thermally conductive structure positioned in an interior of the receptacle and in direct physical contact with a first side of the floor;
   at least one second thermally conductive structure positioned in direct physical contact with and overlying the at least one first thermally conductive structure and structured to physically separate a battery cell assembly from the at least one first thermally conductive structure when the battery call assembly is positioned in the receptacle interior and
   a coolant conduit in direct physical contact with an exterior of the receptacle along a second side of the floor opposite the first side of the floor.

2. The cooling structure of claim 1 wherein a portion of the conduit resides directly opposite the at least one first thermally conductive structure.

3. The cooling structure of claim 2 further comprising:
   another first thermally conductive structure positioned in the interior of the receptacle and in direct physical contact with the first side of the floor, the other first thermally conductive structure being spaced apart from the at least one first thermally conductive structure; and
   another second thermally conductive structure positioned in direct physical contact with and overlying the other first thermally conductive structure and structured to physically separate a battery cell assembly from the at least one first thermally conductive structure when the battery call assembly is positioned in the receptacle interior, the other second thermally conductive structure also being spaced apart from the at least one second thermally conductive structure.

4. The cooling structure of claim 3 wherein a portion of the conduit resides directly opposite the at least one first thermally conductive structure, and a portion of the conduit resides directly opposite the other first thermally conductive structure.

5. The cooling structure of claim 1 wherein the coolant conduit includes an outer wall and an inner wall spaced apart from the outer wall to define a flow passage therebetween, the outer wall and the inner wall being secured in position with respect to the receptacle floor so that the flow passage is in direct physical contact with the receptacle floor.

6. The cooling structure of claim 5 wherein the outer wall includes a first portion and the inner wall includes a first portion positioned opposite and spaced apart from the outer wall first portion, and wherein a space between the outer wall first portion and the inner wall first portion defines one of an inlet or an outlet leading into the flow passage.

7. The cooling structure of claim 5 further comprising a bottom plate secured to the receptacle, and wherein the inner wall and the outer wall are positioned between the bottom plate and the receptacle floor so that the flow passage extends between the receptacle floor and the bottom plate.

8. The cooling structure of claim 1 wherein the at least one first thermally conductive structure is a heat pipe.

9. The cooling structure of claim 1 wherein the at least one second thermally conductive structure is a layer of thermal transfer material.

10. A vehicle battery module including a cooling structure in accordance with claim 1.

11. The vehicle battery module of claim 10 further comprising at least one battery cell assembly in direct physical contact with the at least one second thermally conductive structure.

12. The cooling structure of claim 1, wherein the coolant conduit has an inlet, an outlet, and a flow passage connecting the inlet and the outlet, the inlet, the outlet, and the flow passage being defined by the floor, a bottom plate extending parallel to the floor, an outer wall, and an inner wall spaced apart from and residing opposite the outer wall, the inner and outer walls extending between the floor and the bottom plate.

13. A vehicle battery module comprising:
   a receptacle including a floor;
   a pair of first thermally conductive structures positioned spaced apart in an interior of the receptacle and in direct physical contact with a first side of the floor;
   a second thermally conductive structure positioned in direct physical contact with and overlying an associated one of each of the first thermally conductive structures, each second thermally conductive structure being structured to physically separate a battery cell assembly from the associated first thermally conductive structure when the battery call assembly is positioned in the receptacle interior, each second thermally conductive structure being spaced apart from the first side of the floor by an associated one of the first thermally conductive structures;
   a coolant conduit in direct physical contact with an exterior of the receptacle along a second side of the floor opposite the first side of the floor;
   a first plurality of battery cell assemblies, each battery cell assembly of the first plurality of battery cell assemblies being in direct physical contact with one of the second thermally conductive structures; and
   a second plurality of battery cell assemblies, each battery cell assembly of the second plurality of battery cell assemblies being in direct physical contact with another one of the second thermally conductive structures.

14. The vehicle battery module of claim 13 wherein a portion of the conduit resides directly opposite each first thermally conductive structure of the pair of first thermally conductive structures.

15. A cooling structure for a vehicle battery cell assembly, the cooling structure comprising:
   a receptacle including a thermally-conductive floor;
   at least one first thermally conductive structure positioned in an interior of the receptacle;
   at least one second thermally conductive structure positioned in direct physical contact with and overlying the at least one first thermally conductive structure along a first side of the at least one first thermally conductive structure, the at least one second thermally conductive structure being structured to physically separate a battery cell assembly from the at least one first thermally conductive structure when the battery call assembly is positioned in the receptacle interior;
   at least one third thermally conductive structure positioned in the interior of the receptacle and in direct physical contact with the at least one first thermally conductive structure along a second side of the at least one first thermally conductive structure opposite the first side of the at least one first thermally conductive structure, the at least one third thermally conductive structure also being positioned in direct physical contact with a first side of the floor; and
   a coolant conduit in direct physical contact with an exterior of the receptacle along a second side of the floor opposite the first side of the floor.

* * * * *